UNITED STATES PATENT OFFICE.

JOHN KARSTAIRS, OF DARTFORD, ENGLAND.

EXPLOSIVE AND METHOD OF MAKING SAME.

SPECIFICATION forming part of Letters Patent No. 625,684, dated May 23, 1899.

Application filed March 11, 1899. Serial No. 708,656. (No specimens.)

*To all whom it may concern:*

Be it known that I, JOHN KARSTAIRS, a subject of the Queen of Great Britain and Ireland and Empress of India, and a resident of Dartford, in the county of Kent, England, have invented Improvements in the Manufacture of Explosives, of which the following is a specification.

My invention relates to the manufacture of explosives, and more particularly explosives for use as ammunition in firearms and ordnance.

The object of my invention is to produce a substance or compound which when used in the manufacture of explosives will render them stable, non-hygroscopic, and safe, and so that the explosive will be smokeless, will not have any appreciable eroding action upon the gun-barrel, and will have improved ballistic properties and better propelling effect than explosives heretofore produced.

In carrying out my invention I first produce a new compound by the slow nitration of a mixture of urea and alcohol. For this purpose I may employ ordinary urine (human by preference) and reduce it by evaporation to, say, one-tenth ($\frac{1}{10}$) its volume, or in place of ordinary urine I may use a solution of artificial urea in, say, one and three-quarters ($1\frac{3}{4}$) its weight of water. The reduced urine or solution of urea is then mixed with about one-third its volume of alcohol—say methylated alcohol. To this mixture is added at intervals of, say, twelve hours a quantity of nitric acid, preferably of a specific gravity of 1.45. Each such addition should be about equal to the one-hundredth ($\frac{1}{100}$) part of the combined other fluids, and such additions are continued until, say, twenty such portions have been added. The product of this slow nitration of the mixture of urea and alcohol, with the urea in excess, is a compound which on drying at a temperature below 150° Fahrenheit is in the form of very light yellow needle-form crystals of the definite composition described by the empirical formula $CH_3N_3O_5$ and the graphic formula (as I presume)

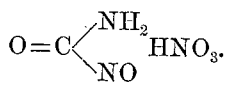

The compound has the physical properties that it is soluble in water, (completely so in one and one-half times its own weight of water at 60° Fahrenheit,) it is slightly soluble in either alcohol or ether, is insoluble in the paraffins and olefins, and has a specific gravity of 1.8. It is very difficult to say exactly what does take place in a reaction covering, as this nitrating process does, a considerable space of time between organic bodies like urea and alcohol; but my investigations have led me to believe that this reaction is represented by the equation

This represents, of course, only the first and final states. Light carbureted hydrogen is given off during the process. I now combine with this compound, which is preferably reduced to a granulated form by grinding, a protective coating to make it stable and non-hygroscopic. For this purpose I may use "gum," which term I use in a sufficiently general sense to include caoutchouc, india-rubber, gum-arabic, &c. If caoutchouc is used, it is dissolved or partially dissolved in naphtha, benzol, or toluene and the solution is incorporated with the above-described compound, so as to practically coat the grains thereof. With the aid of this product I make a safe explosive of high propelling power suitable for ammunition for ordnance and firearms by incorporating the said product with another explosive—such, for instance, as nitrated cellulose or guncotton. By way of example I may combine one part of the above-described coated product with four parts of guncotton of the highest nitration.

The nitrated mixture of urea and alcohol deprives the guncotton of its dangerous properties without damaging its useful properties. On the contrary, the nitrated mixture of urea and alcohol increases the ballistic properties of the guncotton and makes the latter a valuable propelling explosive, which is not only safe, but has little or no eroding action on the gun.

The explosive composition may be made up in any suitable form—as, for instance, disks, cords, or grains for cartridges or any other suitable use.

I claim as my invention—

1. As a new article of manufacture, the herein-described compound for use in the manufacture of explosives, consisting of a crystalline body soluble in water, with a specific gravity of 1.8 and having the empirical formula $CH_3N_3O_5$, substantially as described.

2. As a new article of manufacture, the herein-described compound for use in the manufacture of explosives, consisting of a gum combined with a crystalline body, soluble in water, with a specific gravity of 1.8 and having the empirical formula $CH_3N_3O_5$, substantially as described.

3. As a new article of manufacture, the herein-described explosive, consisting of the combination of a known explosive body with a crystalline body soluble in water, having a specific gravity of 1.8 and having the empirical formula $CH_3N_3O_5$, and a protective coating for the crystalline body, substantially as described.

4. As a new article of manufacture, the herein-described explosive, consisting of the combination of nitrated cellulose with a crystalline body soluble in water, with a specific gravity of 1.8 and having the empirical formula $CH_3N_3O_5$ and a protective coating for the said body, substantially as described.

5. As an improvement in the manufacture of explosives, the herein-described process of first slowly nitrating a mixture of urea and alcohol, granulating the crystals produced and then combining therewith a protective coating, substantially as described.

6. The herein-described process of making explosives, consisting of first nitrating a mixture of urea and alcohol, granulating the crystals produced then combining therewith a protective coating and finally combining with the same nitrated cellulose, substantially as described.

7. The herein-described process of making explosives, consisting in first nitrating a mixture of urea and alcohol, granulating the crystals produced and then combining therewith a protective coating, and finally combining with the same another explosive body.

In testimony whereof I have signed my name to this specification in the presence of two subscribing witnesses.

JOHN KARSTAIRS.

Witnesses:
F. WARREN WRIGHT,
HUBERT HOWSON.